(12) United States Patent
Miyazaki et al.

(10) Patent No.: US 6,631,054 B2
(45) Date of Patent: Oct. 7, 2003

(54) THIN FILM MAGNETIC HEAD, A MAGNETIC HEAD DEVICE, A MAGNETIC DISK DRIVE DEVICE, AND A METHOD FOR MANUFACTURING A THIN FILM MAGNETIC DEVICE

(75) Inventors: Tetsuo Miyazaki, Toyko (JP); Noboru Yamanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 319 days.

(21) Appl. No.: 09/759,249

(22) Filed: Jan. 16, 2001

(65) Prior Publication Data
US 2001/0017751 A1 Aug. 30, 2001

(30) Foreign Application Priority Data
Feb. 17, 2000 (JP) .......................... 2000-040199

(51) Int. Cl.[7] .............................. G11B 5/39; G11B 5/147
(52) U.S. Cl. ........................................ 360/317; 360/126
(58) Field of Search .................................. 360/126, 317

(56) References Cited
U.S. PATENT DOCUMENTS

| 5,225,953 A | * | 7/1993 | Wada et al. ................. 360/126 |
| 5,285,340 A | | 2/1994 | Ju et al. |
| 5,438,747 A | | 8/1995 | Krounbi et al. |
| 5,452,164 A | | 9/1995 | Cole et al. |
| 5,452,166 A | * | 9/1995 | Aylwin et al. ............... 360/126 |
| 5,615,069 A | * | 3/1997 | Slade et al. ................. 360/126 |
| 5,792,569 A | * | 8/1998 | Sun et al. .................... 428/692 |
| 6,043,960 A | * | 3/2000 | Chang et al. ............... 360/317 |

FOREIGN PATENT DOCUMENTS

JP  9-259408  * 10/1997

* cited by examiner

Primary Examiner—David L. Ometz
(74) Attorney, Agent, or Firm—Oliff & Berridge, PLC

(57) ABSTRACT

A second magnetic film of an inductive type electromagnetic conversion element is positioned at a trailing edge side relative to a first magnetic film of the conversion element. One edge portion of the second magnetic film is opposed to one edge portion of the first magnetic film by a given distance. The one edge portion of the second magnetic film has at least one side surface inclined at a given inclination angle not less than a maximum skew angle. The second magnetic film is extended backward, and joined with the first magnetic film. A coil film of the inductive type electromagnetic conversion element is whirled around the magnetic circuit composed of the first and second magnetic films.

14 Claims, 15 Drawing Sheets

THIN FILM MAGNETIC HEAD, A MAGNETIC HEAD DEVICE, A MAGNETIC DISK DRIVE DEVICE, AND A METHOD FOR MANUFACTURING A THIN FILM MAGNETIC DEVICE

BACKGROUND OF THE INVENTION

1) Field of the Invention

This invention relates to a thin film magnetic head, a magnetic head device a magnetic disk device, and a method for manufacturing a thin film magnetic head.

2) Related Art Statement

Combination type thin film magnetic heads, each having an inductive type writing element and a MR reading element, have been employed as thin film magnetic heads to constitute magnetic disk drive devices of memory devices in a computer.

Two types of longitudinal magnetic recording element and perpendicular magnetic recording element are well known as the inductive type writing element. In this specification, a thin film magnetic head having the longitudinal magnetic recording element will be called as a "longitudinal recording thin film magnetic head", and a thin film magnetic head having the perpendicular magnetic recording element will be called as a "perpendicular" recording thin film magnetic head.

The above thin film magnetic head is mounted at the forefront of a head supporting device called as a gimbal. The head supporting device is driven by a position determining device. A rotary-actuator system is generally employed as the drive system of the position determining device. The thin film magnetic head is positioned on a given track position of a magnetic disk through the rotation drive of the position determining device for the head supporting device. The position of the thin film magnetic head on the magnetic disk is defined by a rotation angle called as a "skew angle".

Generally, the position of the center line of the writing element of the thin film magnetic head tangent to the circumference of the magnetic disk is defined as skew angle zero. If the thin film magnetic head is moved toward the inside or the outside of the magnetic disk, the skew angle is increased from the zero value of the skew angle. The skew angle is normally set within 25 degrees.

The edge portion of the thin film magnetic head, which corresponds to the outflow edge of airflow when the magnetic disk is rotated, is called as a trailing edge, and the opposite edge portion to the trailing edge is called as a leading edge.

For realizing a high recording density in the magnetic disk using the thin film magnetic head, it is required that data amount (data density) to be restored in the unit area of the magnetic disk is enhanced. The surface recording density depends on the performance of the recording element of the magnetic head.

In the longitudinal recording thin film magnetic head, the surface recording density can be enhanced by reducing the gap length between the pole portions of the writing element. However, the reduction of the gap length is restricted because the magnetic flux generated in between the pole portions is decreased as the gap length is decreased.

In the longitudinal recording thin film magnetic head, if the data track number recordable in the magnetic disk is increased, the surface recording density can be enhanced. The recordable data track number is usually called as a "TPI (track per inch)". The TPI performance of the writing element can be developed by reducing the size of the thin film magnetic head to define the data track width. The head size is usually defined as a "track width". In this specification, the track width direction will be called as a "track direction".

An attempt is made to narrow the track width of the longitudinal recording thin film magnetic head in prior art documents. For example, Kokai Publications Kokai Hei 7-262519 and 7-225917 disclose that a first pole portion is processed by ion beam milling with a second pole portion as a mask, obtained by photolithography, so that the track width of the first pole portion can correspond to that of the second pole portion.

Kokai Publication Kokai Hei 6-28636 discloses a method for narrowing a track width as follows: After a first magnetic yoke layer (first yoke portion) is formed, a photoresist layer is formed, in which an opening is formed in order to form a magnetic pole edge assembly composed of a first pole portion, a gap film, and a second pole portion. Then, the magnetic pole edge assembly is formed in the opening, and thereafter, the part of the photoresist layer positioned at the forefront of the assembly is removed. Subsequently, a coil structure and an insulating film are formed by a conventional manner, and a second magnetic yoke layer (second yoke portion) is formed.

However, the aspect ratio (a ratio "t/w" of a thickness "t" to a width "w") of the magnetic film constituting the writing pole portion is increased as the track width of the writing pole portion is narrowed. The narrowing the track width for high recording density enables the TPI to have a higher value, and thus, the distance between the adjacent tracks is set to an extremely small value of for example about 0.9 $\mu$m.

If the magnetic film constituting the writing pole portion, particularly the magnetic film positioned at the trailing edge side (usually called as a "top magnetic film") has a higher aspect ratio, the edge of the top magnetic film may be overlapped on the neighboring track in a large skew angle region. As a result, data recorded in the neighboring track may be rewritten or erased.

It is known that a perpendicular recording thin film magnetic head can have remarkably high recording density compared with the above longitudinal recording thin film magnetic head. However, if the perpendicular recording thin film magnetic head also have a higher TPI, the magnetic field generated from the side edge of the writing magnetic pole is overlapped on the neighboring track in a large skew angle region. As a result, data recorded in the neighboring track may be rewritten and erased. Herein, the wording "side edge" means edge portion of the writing magnetic pole in the track direction.

SUMMARY OF THE INVENTION

It is an object of the present invention to provide a thin film magnetic head, a magnetic head device and a magnetic disk drive device which can avoid magnetic harmful effects such as the above data-rewriting and data-erasing in the neighboring track.

It is another object of the present invention to provide a thin film magnetic head, a magnetic head device and a magnetic disk drive device which, in developing their TPI performances and realizing their high density recording, can avoid magnetic harmful effects such as the above data-rewriting ad data-erasing in the neighboring track.

It is still another object of the present invention to provide a method for preferably manufacturing the above thin film magnetic head.

For achieving the above objects, a thin film magnetic head according to the present invention includes a slider and at least one inductive type electromagnetic conversion element, and is driven in a radial direction of a magnetic disk at a given skew angle, as combined with the magnetic disk.

The inductive type electromagnetic conversion element includes a first magnetic film and a second magnetic film and a coil film, and is supported by the slider. One edge portion of the first magnetic film is positioned at an air bearing surface (hereinafter, called as an "ABS") side, and the first magnetic film is extended backward from the ABS. The second magnetic film is positioned at a trailing edge side, and one edge portion of the second magnetic film is opposed to the first magnetic film by a given distance in the ABS side. Then, the second magnetic film is extended backward from the ABS, and joined with the first magnetic film. The coil film is whirled around the magnetic circuit composed of the first and second magnetic films.

The one edge portion of the second magnetic film has at least one side surface inclined at a given inclination angle not less than the maximum skew angle in a track direction.

As mentioned above, the one edge portion of the first magnetic film is positioned at the ABS side, and the one edge portion of the second magnetic film is opposed to that of the first magnetic film via the given distance. Then, the first magnetic film is extended backward from the ABS, and the second magnetic film is extended backward from the ABS, joined to the first magnetic film. As a result, a thin film magnetic circuit having a writing pole portion in the ABS side is completed.

The coil film is whirled around the magnetic circuit composed of the first and the second magnetic films. Therefore, when a writing current is flown in the coil film, a writing magnetic flux is passed through the thin film magnetic circuit.

Since the one edge portion of the first magnetic film is positioned in the ABS side of the slider, and the one edge portion of the second magnetic film is opposed to that of the first magnetic film via the given distance, a writing magnetic field to magnetically record in the magnetic disk is generated at the gap thereof.

The second magnetic film is positioned in the trailing edge side relative to the first magnetic film, and the one edge portion thereof has at least one side surface inclined at the given inclination angle not less than the maximum skew angle in a track direction. Therefore, even though the second magnetic film has a large aspect ratio, the one edge portion of the second magnetic film can not overlap the neighboring track in a large skew angle region. As a result, the data-rewriting or the data-erasing in the neighboring track can be avoided.

The inclination of the side surface of the one edge portion of the second magnetic film depends on the recording method, that is, a longitudinal recording or a perpendicular recording of the thin film magnetic head. In the longitudinal recording thin film magnetic head, the inductive type electromagnetic conversion element includes a gap film, and thus, the one edge portions of the first and second magnetic films are opposed each other via the gap film.

In the longitudinal recording thin film magnetic head, the side surface of the one edge portion of the second magnetic film is inclined so that the track width can be decreased toward the trailing edge. Therefore, if the second magnetic film has a large aspect ratio, the one edge portion thereof can not overlap the neighboring track in a large skew angle region. As a result, the data-rewriting or the data-erasing in the neighboring track can be avoided.

In the perpendicular recording thin film magnetic head, the second magnetic film includes a main pole portion to constitute a perpendicular writing pole portion and a supplementary pole portion to magnetically join the main pole portion and the first magnetic film. The first magnetic film constitutes a magnetic flux-returning path from the main pole portion. In this case, the main pole portion has at least one inclined side surface at one edge thereof. The side surface is inclined so that the track width can be increased toward the trailing edge.

In this case, recorded data by the magnetic field generated at the side edge of the main pole portion are canceled by the magnetic field generated at the opposite edge to the trailing edge (hereinafter, called as a "back edge"). Therefore, magnetic recording is carried out only by the magnetic field generated at the back edge. As a result, only if the magnetic recording is carried out depart from the neighboring track by the magnetic field generated at the back edge, the magnetic field can not overlap the neighboring track in the skew region, and thus, data-rewriting and data-erasing can be inhibited even though the magnetic disk has a large TPI.

This invention will disclose a magnetic head device and a magnetic disk drive device which has the above thin film magnetic head, and a method for the thin film magnetic head.

The other objects, constructions and advantages of the present invention will be described in detail, with reference to the attached drawings in the following embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

<Thin Film Magnetic Head in a First Embodiment>

Figure 1:
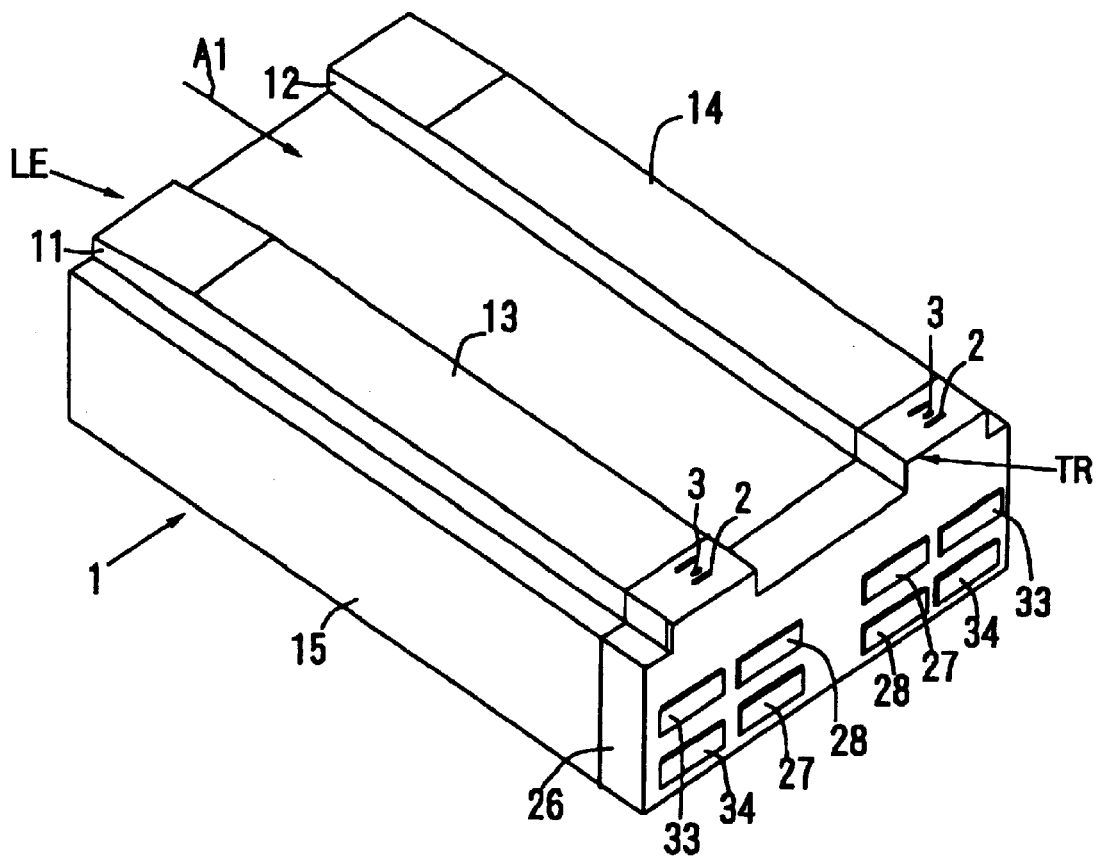
FIG. 1 is a perspective view of a longitudinal recording thin film magnetic head according to the present invention.
Figure 2:
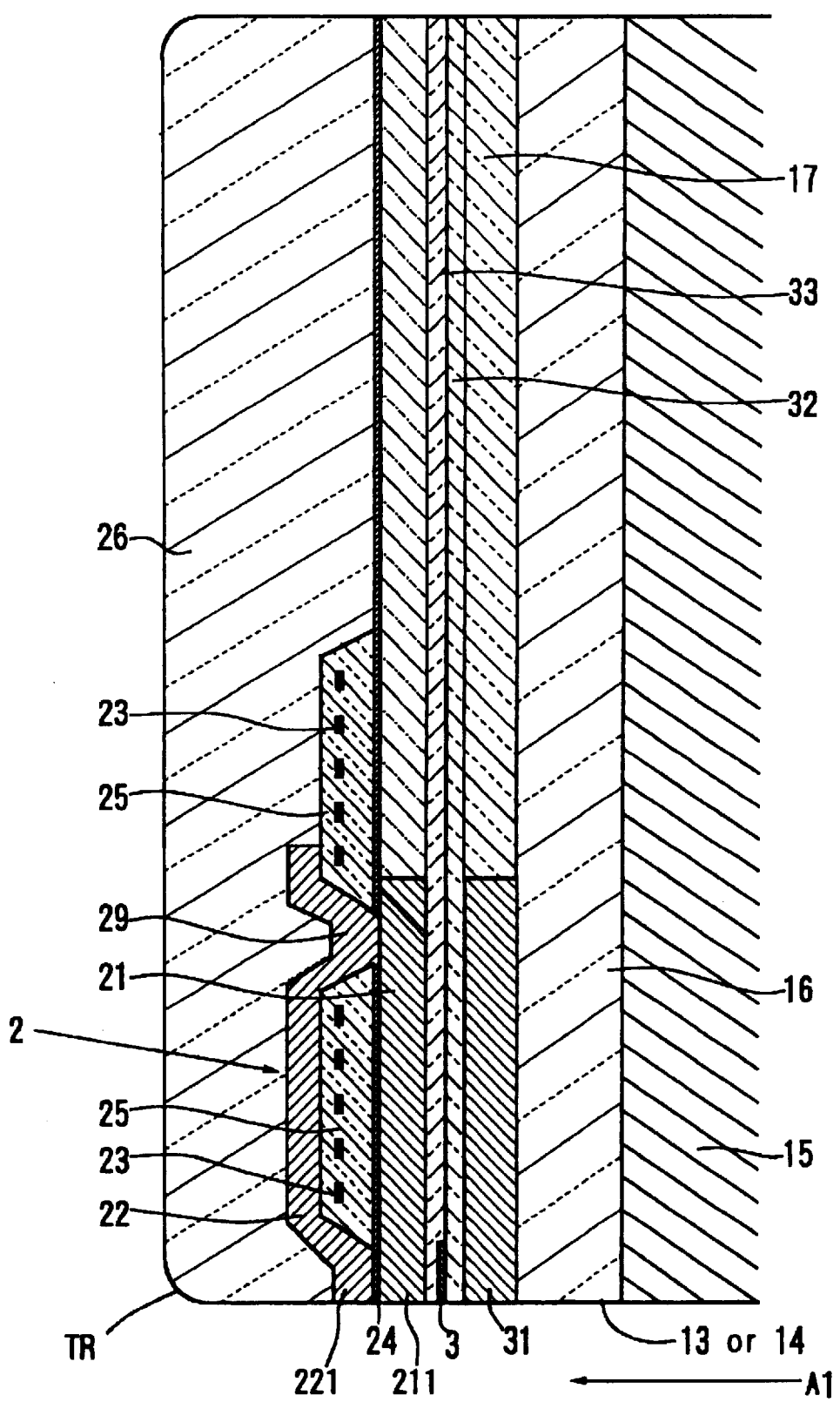
FIG. 2 is an enlarged cross sectional view of the thin film magnetic head shown in FIG. 1.
Figure 3:
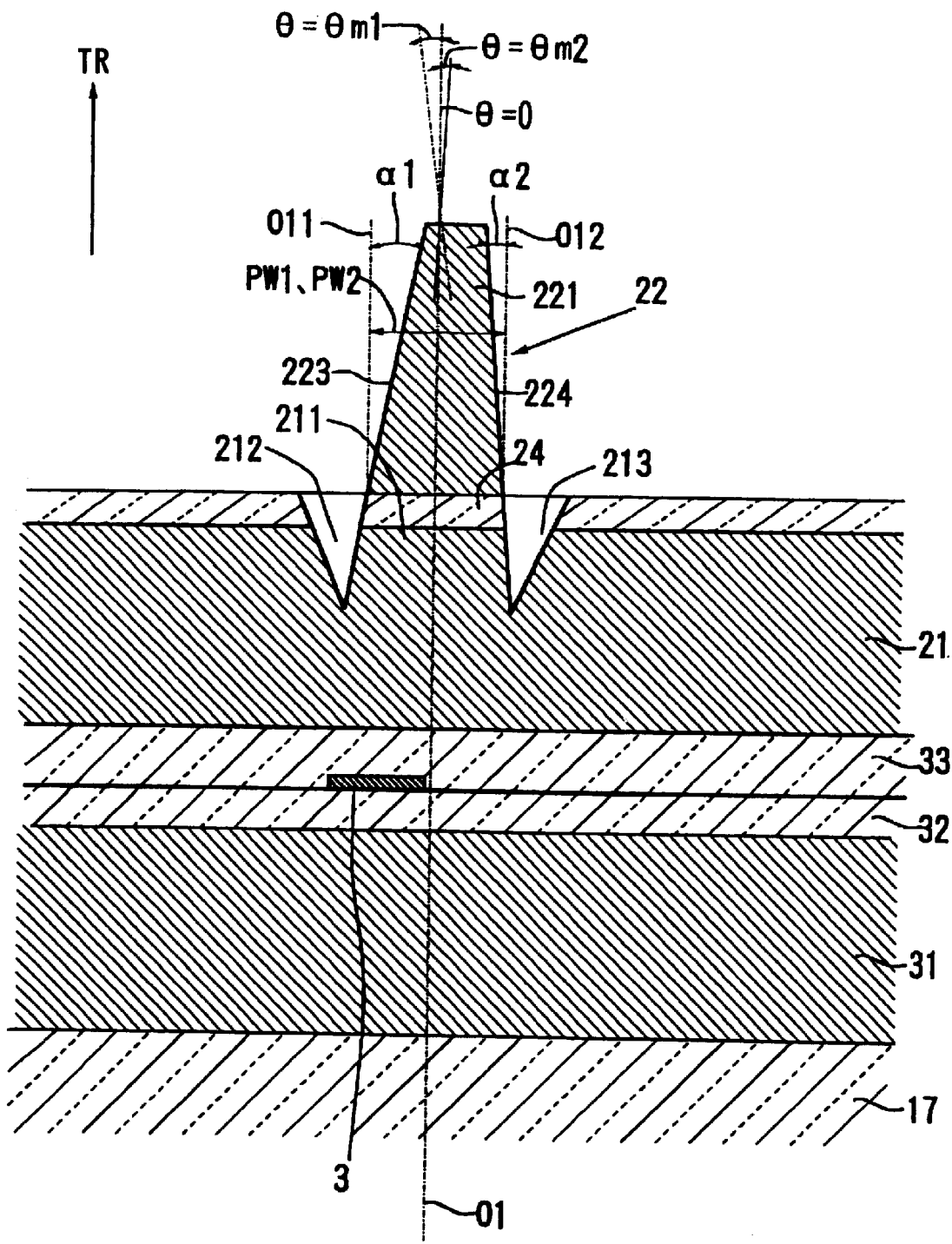
FIG. 3 is an enlarged end view of the pole structure of the thin film magnetic head shown in FIGS. 1 and 2, as viewed from the ABS.

FIG. 1 is a perspective view of a longitudinal recording thin film magnetic head according to the present invention, and FIG. 2 is an enlarged cross sectional view of the thin film magnetic head shown in FIG. 1. FIG. 3 is an enlarged end view of the pole structure of the thin film magnetic head shown in FIGS. 1 and 2, as viewed from the ABS. In these views, the sizes of some parts are exaggerated, and different from the real ones. A longitudinal recording thin film magnetic head depicted in FIG. 1 includes a slider 1, an inductive type electromagnetic conversion element 2 and a magnetoresistive effective element 3 (hereinafter, called as a "MR element").

The slider 1 has rails 11 and 12 on its opposing surface to a magnetic recording medium, and the surfaces of the rails 11 and 12 are employed as air bearing surfaces (hereinafter, often called as "ABS"s) 13 and 14. The slider 1 does not always have the two rails 11 and 12, and may have one to three rail part. Moreover, the slider may have a flat surface having no rail. For improving its floating characteristic, the opposing surface of the slider may have various geometrical shapes. This invention can be applied for any types of slider. The slider 1 may have protective films, made of DLC or the like, having a thickness of 8–10 nm on the rails. In this case, the surfaces of the protective films correspond to the ABSs. The slider 1 is a ceramic structural body composed of a substrate 15 made of $Al_2O_3$—TiC, etc. and an inorganic insulating film 16 made of $Al_2O_3$, $SiO_2$ etc. on the substrate 15.

The inductive type electromagnetic conversion element 2 serves as a writing element, and the MR element 3 serves as a reading element. The inductive type electromagnetic conversion element 2 and the MR element 3 are provided in the trailing edge TR side of either or both of rails 11 and 12. The edge portions of the inductive type electromagnetic conversion element 2 and the MR element 3 are exposed to the ABSs 13 and 14 for electromagnetic conversion. On the trailing edge are provided pull-out electrodes 27 and 28 connected to the inductive type electromagnetic conversion element 2 and pull-put electrodes 33 and 34 connected to the MR element 3.

The inductive type electromagnetic conversion element 2 has a first magnetic film 21 doubling as a second shielding film for the MR element 3, a second magnetic film 22, a coil film 23, a gap film 24 made of alumina or the like, an insulating film 25 and a protective film 26. The second shielding film for the MR element 3 may be made of another magnetic film.

The forefronts 211 and 221 of the first magnetic film 21 and the second magnetic film 22 are opposed each other via the thin gap film 24, and constitute a pole portion of the thin film magnetic head for writing. The first and second magnetic films 21 and 22 may be composed of a magnetic single layer or a magnetic multilayer for improving the properties of the pole portion. In view of narrowing the track width and developing the recording performance, various modification has been made for the pole portion structure. This invention can be applied for any pole portion structures. The gap film 24 is composed of a non-magnetic metal film or an inorganic insulating film such as alumina.

The second magnetic film 22 is risen up at a given angle on the gap film 24 in the pole portion side. The rising angle is called as a "apex angle". Moreover, the distance between the forefront of the pole portion and the rising point is called as a "throat height".

The second magnetic film 22 is extended backward from the ABSs 13 and 14 with keeping a given inner gap for the first magnetic film 21, and joined with the first magnetic film 21 at a backside joining portion 29. As a result, a thin film magnetic circuit is completed with the first and the second magnetic films 21 and 22, and the gap film 24.

The coil film 23 is sandwiched with the first and second magnetic films 21 and 22, and whirled around the backside joining portion 29. Both ends of the coil film 23 are connected to the pull-out electrodes 27 and 28 (see, FIG. 1). The winding number and layer number of the coil film 23 are not restricted.

The insulating film 25 may be composed of an organic insulating resin film or a ceramic film such as an $Al_2O_3$ film or a $SiO_2$ film. The ceramic insulating film can reduce its maximum protrusion volume than the organic insulating film because it has a smaller heat expansion.

The coil film 23 is embedded in the insulating film 25, which is filled in the inner gap between the first and the second magnetic films 21 and 22 and on which the second magnetic film 22 is provided. Therefore, the coil film 23 is electrically insulated from the first and the second magnetic films 21 and 22.

Then, the inductive type electromagnetic conversion element 2 is covered with a protective film 26 made of an inorganic insulating material such as $Al_2O_3$ or $SiO_2$ entirely.

In FIG. 3, the edge portion 221 of the second magnetic film 22 has side surfaces 223 and 224 in the track direction inclined toward the trailing edge TR. However, it can satisfy the requirement of the present invention if the edge portion 221 has either of the inclined side surfaces 223 and 224.

The inclination angles $\alpha 1$ and $\alpha 2$ of the inclined side surfaces 223 and 224 are not less than the maximum skew angles $\theta m1$ and $\theta m2$. That is, the conditions of $\alpha 1 \geq \alpha m1$ and $\alpha 2 \geq \alpha m2$ must be satisfied.

The inclination angles $\alpha 1$ and $\alpha 2$ are defined as inclination angles from the standard lines O11 and O12 parallel to the center line O1 of the writing element composed of the above inductive type electromagnetic conversion element. That is, the inclination angles $\alpha 1$ and $\alpha 2$ correspond to the bottom interior angles of the rectangular end surface of the pole portion. In FIG. 3, the width of the edge portion 221 of the second magnetic film 22, that is, the track width PW2 is decreased toward the trailing edge TR. The inclination angles $\alpha 1$ and $\alpha 2$ depend on the maximum skew angles $\theta m1$ and $\theta m2$, and thus, may have the same value or different values. If the inclination angles $\alpha 1$ and $\alpha 2$ have the same value, the edge portion 221 has a symmetrically sectional shape. If the inclination angles $\alpha 1$ and $\alpha 2$ have different values, the edge portion 221 has an asymmetrically sectional shape.

In FIG. 3, the maximum skew angles $\theta m1$ is larger than the maximum skew angle $\theta m2$, and the inclination angle $\alpha 1$ is larger than the inclination angle α2. If the relation of θm1≦θm2 is satisfied, the relation of α1≦α2 may be satisfied.

In FIG. 3, depressed portions 212 and 213 are formed in both sides of the edge portion 211 of the first magnetic film 21, and define the track width PW1.

The MR element 3 may be composed of any kind of film structure well known. For example, the MR element 3 may be composed of an anisotropic magnetoresistive effective element made of permalloy, etc., a spin-valve structural film, a giant magnetoresistive (GMR) effective film made of a perovskite type magnetic film, etc., and a ferromagnetic tunnel junction effective element. This invention can be applied for any kind of MR element. The MR element 3 is embedded in an insulating film 32 made of alumina, etc. between a first shielding film 31 and a second shielding film composed of the first magnetic film 21. Then, the MR element 3 is connected to the pull-out electrodes 33 and 34 (see, FIG. 1).

Figure 4:
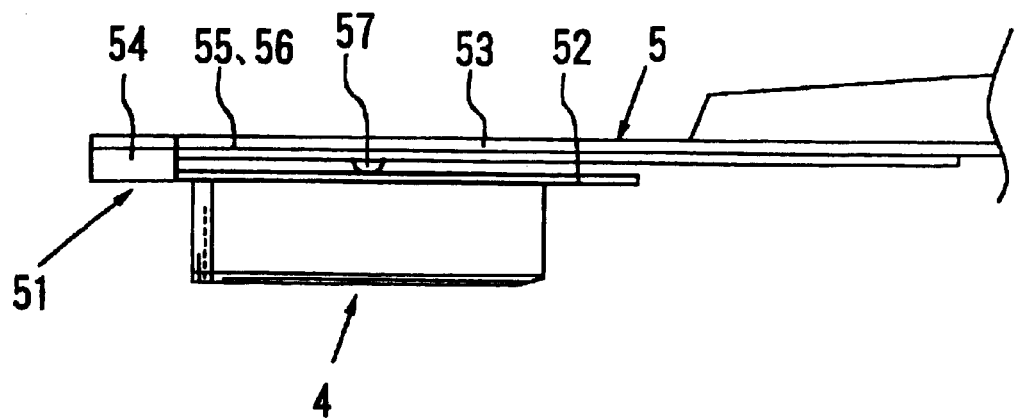
FIG. 4 is an elevational view showing a part of a magnetic head device according to the present invention.
Figure 5:
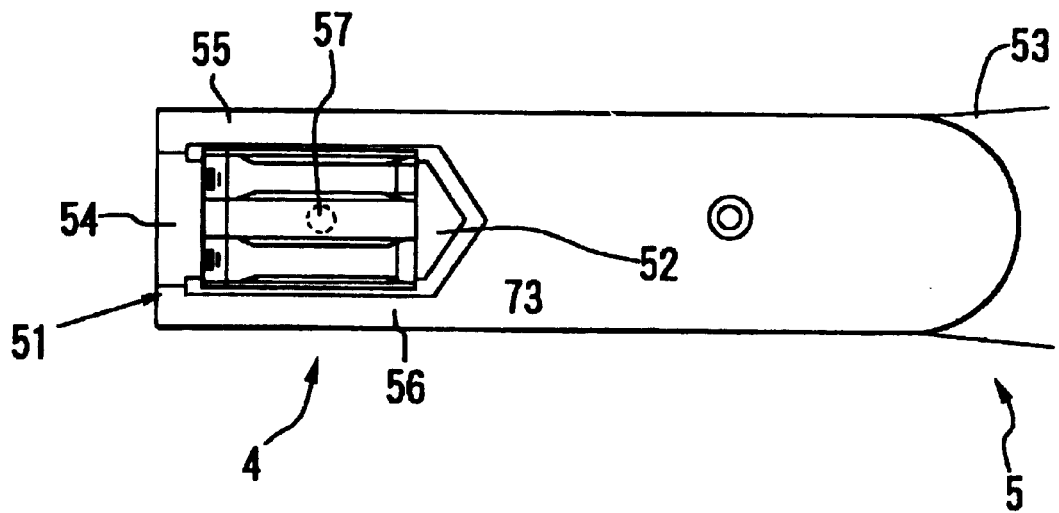
FIG. 5 is a bottom view of the magnetic head device shown in FIG. 4.

FIG. 4 is an elevational view showing a part of a magnetic head device according to the present invention, and FIG. 5 is a bottom view of the magnetic head device shown in FIG. 4. A depicted magnetic head device includes a thin film magnetic head 4 and head supporting device 5. The thin film head 4 is similar to the one shown in FIGS. 1–3.

The head supporting device 5 supports the thin film magnetic head 4 at the under surface of a flexible member 51 made of metallic plate attached on the free edge thereof in the long direction of a supporting member 53 made of metallic plate.

The flexible member 51 has two outer frames 55 and 56 extending along the long direction of the supporting member 53, a side frame 54 to joined the outer frames 55 and 56 at the edge thereof, and a tongue-shaped member 52, of which one end is a free edge, extending along the outer frames 55 and 56 from the center of the side frame.

On the center of the tongue shaped member 52 is positioned a hemispherical loading protrusion 57, bulging on the supporting member 53, to apply load to the tongue-shaped member 52 from the loading protrusion 57.

The thin film magnetic head 4 is attached on the under surface of the tongue-shaped member 52 so that it can have its air outflow edge along the side frame 54. The head supporting device according to the present invention is not limited to the above embodiment.

Figure 6:
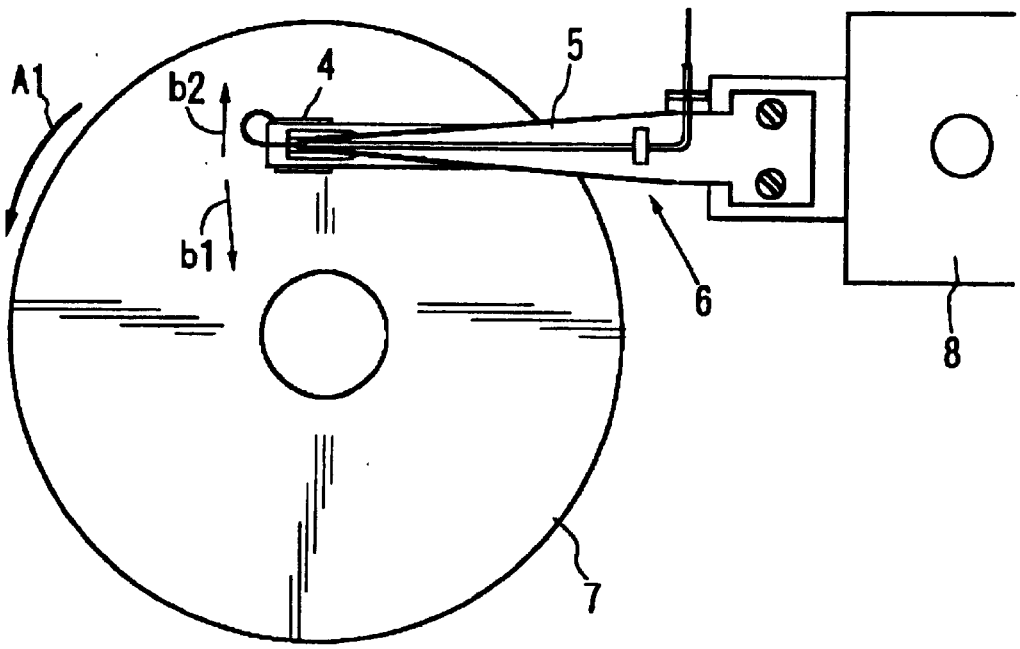
FIG. 6 is a plan view of a magnetic disk drive device according to the present invention.
Figure 7:
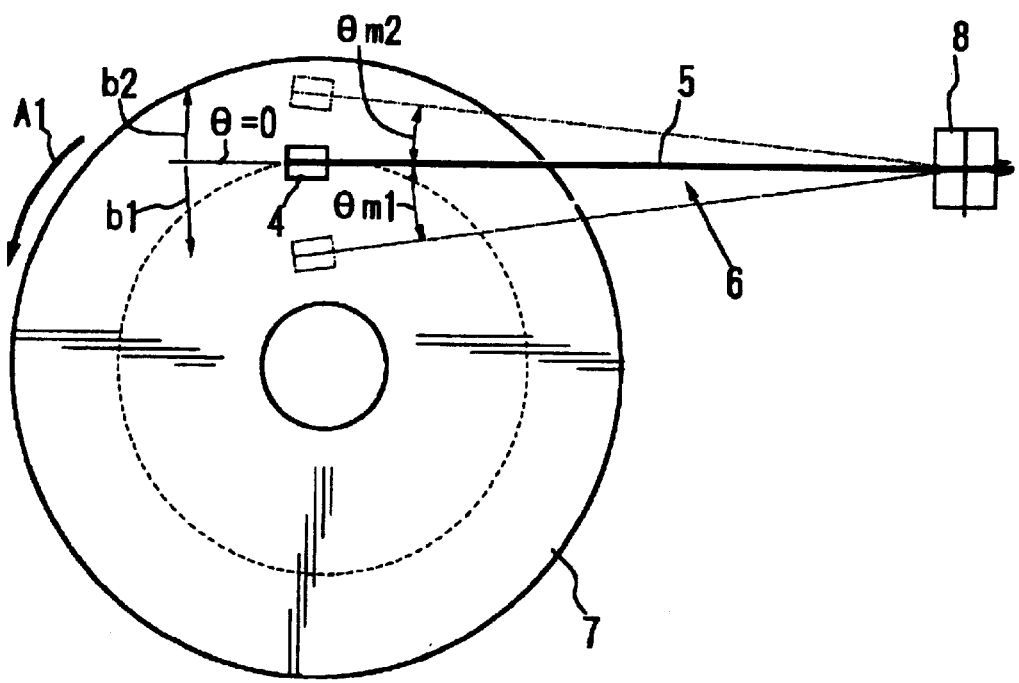
FIG. 7 is a schematic view for explaining the driving condition of the magnetic disk drive device shown in FIG. 6.

FIG. 6 is a plan view of a magnetic disk drive device according to the present invention, and FIG. 7 is a schematic view for explaining the driving condition of the magnetic disk drive device shown in FIG. 6. A magnetic recording drive device depicted in the figures includes a magnetic head device 6 similar to the one shown in FIGS. 4 and 5 and a magnetic disk 7. The magnetic head device 6 is driven by a position determining device 8 which supports one end of the device 6. The thin film magnetic head 4 of the magnetic head device 6 is supported by the head supporting device 5 so that it can face the magnetic recording surface of the magnetic disk 7.

When the magnetic disk 7 is rotated in an A1 direction by a not shown driving device, the thin film magnetic head 4 is floated from on the magnetic disk 7 by a minute distance. The magnetic recording drive device shown in FIG. 6 is called as a "rotary-actuator driving system". In this case, the thin film magnetic head 4 attached to the forefront of the head supporting device 5 is driven in a radial direction b1 or b2 of the magnetic disk 7 and positioned on a given track by the position determining device 8 to rotate the head supporting device 5.

The thin film magnetic head 4, as shown in FIG. 7, is driven at the maximum skew angle θm1 in the inner side of the magnetic disk 7 and at the maximum skew angle θm2 (θm1>θm2) in the outer side of the magnetic disk 7 from the position of the skew angle=0.

As is explained in FIGS. 1–3, in the thin film magnetic head, the edge portions 211 and 221 in the ABSs 13 and 14 side of the first and second magnetic films 21 and 22 included in the inductive type electromagnetic conversion element 2 are opposed each other via the gap film 24, and constitutes the pole portion. Then, the second magnetic film 22 is extended backward from the ABSs 13 and 14, and joined with the first magnetic film 21 at the backside joining portion 29. As a result, the thin film magnetic circuit is completed which has the pole portion composed of the edge portions 211 and 221 in the ABSs 13 and 14 side.

The coil film 23 is passed through the inner gap between the first and second magnetic films 21 and 22, and whirled around the backward joining portion 29. As a result, a writing magnetic flux is flown in the thin film magnetic circuit composed of the first and second magnetic film 21 and 22, and the gap film 24, and thus, a writing magnetic field to magnetically record in the magnetic disk is generated at the writing pole portion composed of the edge portions 211 and 221.

As explained in FIG. 3, the edge portion 221 of the second magnetic film 22 to constitute the writing pole portion has the side surfaces 223 and 224 which are inclined so that the track width PW2 can be decreased toward the trailing edge TR. Therefore, if the second magnetic film 22, positioned at the trailing edge TR side, has a large aspect ratio (ratio t/W of thickness "t" to width "w"), for example, (2.5 μm/0.6 μm), its edge portion in the trailing edge TR side can not overlap the neighboring track. As a result, the matter of rewriting or erasing the data in the magnetic disk can be removed. In this point, detail explanation will be given with reference to FIGS. 7–10.

Figure 8:
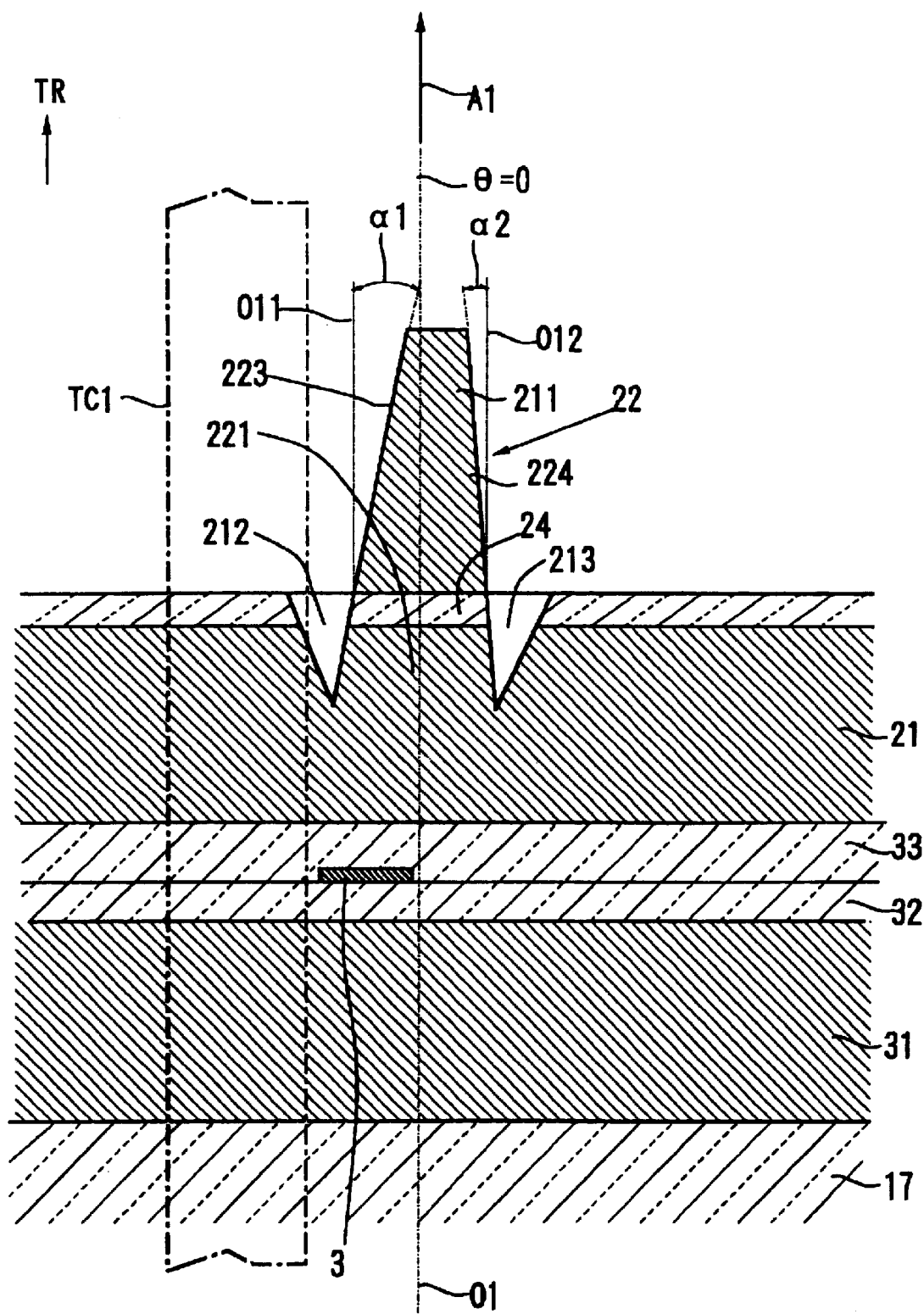
FIG. 8 is an end view showing the state in which the writing pole is positioned at its skew angle θ=0.

FIG. 8 is an end view showing the state in which the writing pole is positioned at its skew angle θ=0 in the magnetic recording drive device shown in FIG. 7. In this case, the center line O1 of the thin film magnetic head correspond to the A1 running direction of the magnetic disk. The inclined side surface 223 of the edge portion 221 to constitute the pole portion is inclined at an inclination angle α1 toward the trailing edge TR, apart from the neighboring track TC1. Therefore, the edge portion 221 can not overlap the neighboring track TC1 in the trailing edge TR side. As a result, the matter of rewriting or erasing the data in the magnetic disk can be removed.

Figure 9:
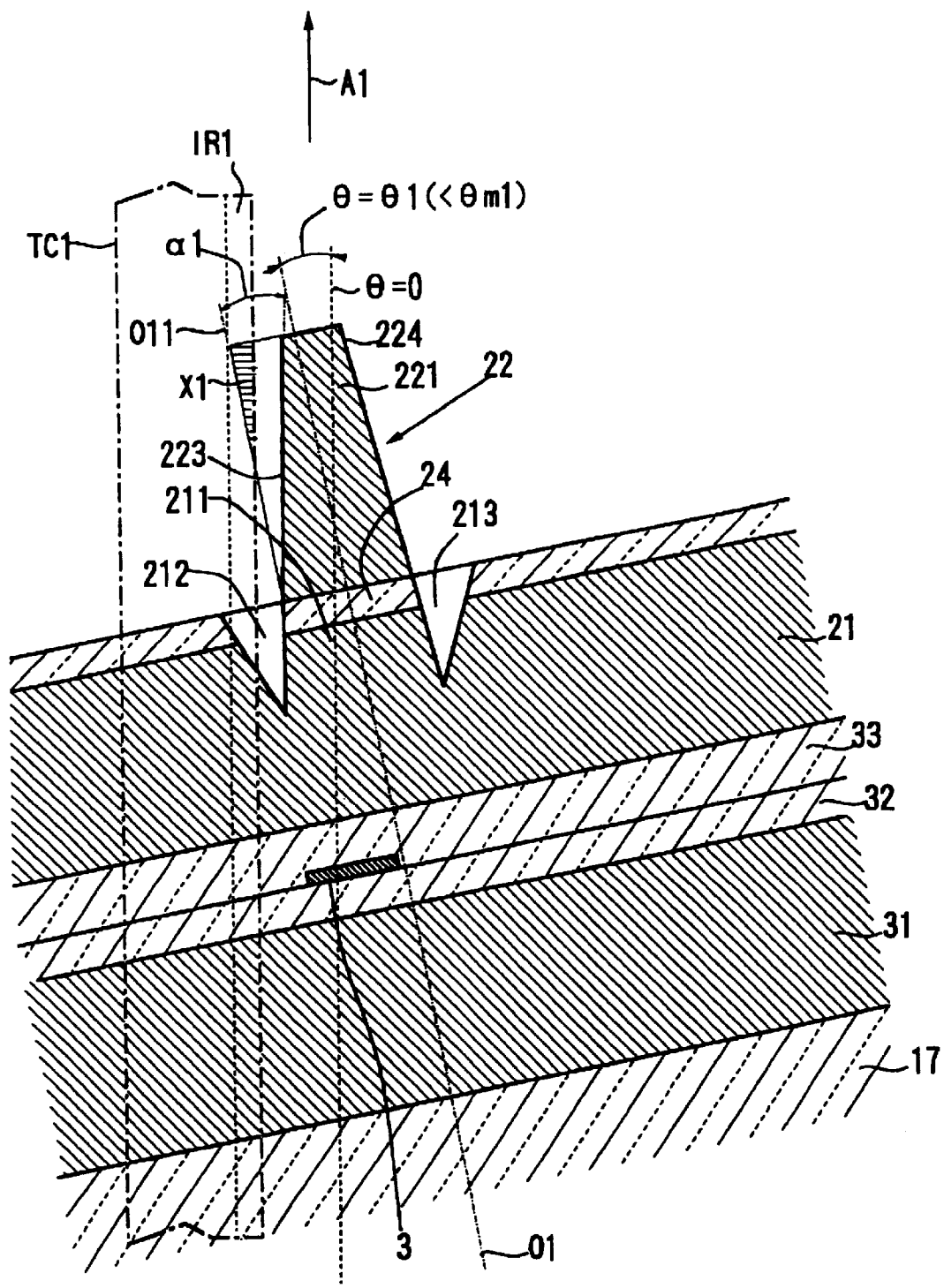
FIG. 9 is an end view showing the state in which the thin film magnetic head is skewed toward the inside of the magnetic disk.

FIG. 9 is an end view showing the state in which the thin film magnetic head is skewed at a skew angle θ slightly smaller than the maximum skew angle θm1 toward the inside of the magnetic disk in the magnetic recording drive device shown in FIG. 7.

In this case, the center line O1 of the thin film magnetic head 4 is inclined by a skew angle θ1 smaller than the inclination angle α1 of the inclined side surface 223 from the A1 running direction of the magnetic disk 7. Therefore, the edge portion 221 can not overlap the neighboring track TC1 in the trailing edge TR side. As a result, the matter of rewriting or erasing the data in the track TC1 can be removed. Moreover, a side erase or a recording blur can be avoided.

If the edge portion 221 of the second magnetic film 22 has a conventional rectangular-shaped cross section as designated by a hatched part X1 in FIG. 9, the edge portion 221 overlaps the neighboring track TC1 partially at the hatched part X1, and thus, may rewrite or erase the data recorded in the track TC1, and bring about the side erase or the recording blur IR1 in the track TC1.

Figure 10:
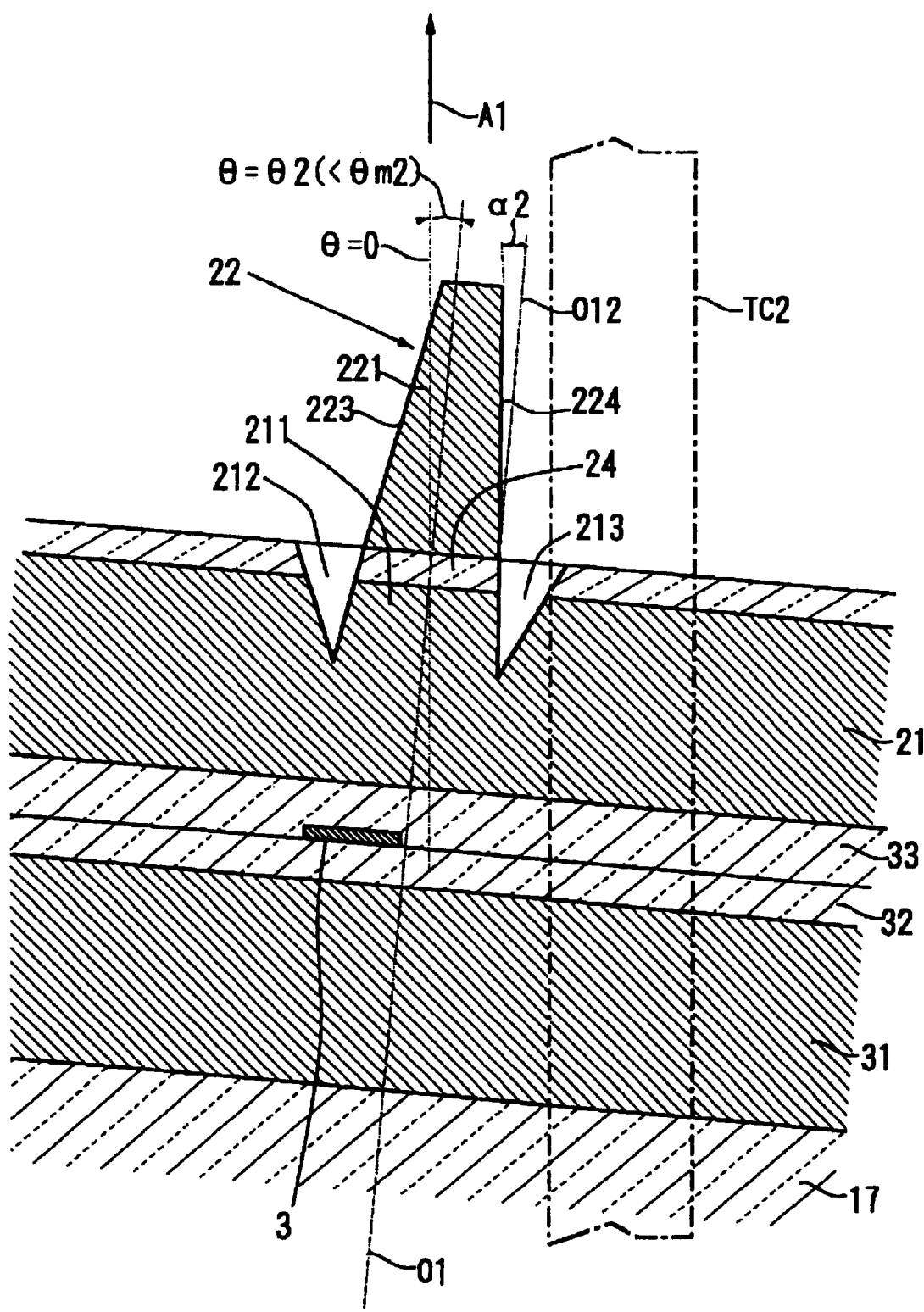
FIG. 10 is an end view showing the state in which the thin film magnetic head is skewed toward the outside of the magnetic disk.

FIG. 10 is an end view showing the state in which the thin film magnetic head is skewed at a skew angle θ slightly smaller than the maximum skew angle θm2 toward the outside of the magnetic disk in the magnetic recording drive device shown in FIG. 7. The center line O1 of the is inclined by a skew angle θ2 smaller than the inclination angle α2 of the inclined side surface 224 from the A1 running direction of the magnetic disk. Therefore, the edge portion 221 can not overlap the neighboring track TC2 in the trailing edge TR side. As a result, the matter of rewriting or erasing the data in the track TC2 can be removed. Moreover, a side erase or a recording blur in the track TC2 can be avoided.

Figure 11:
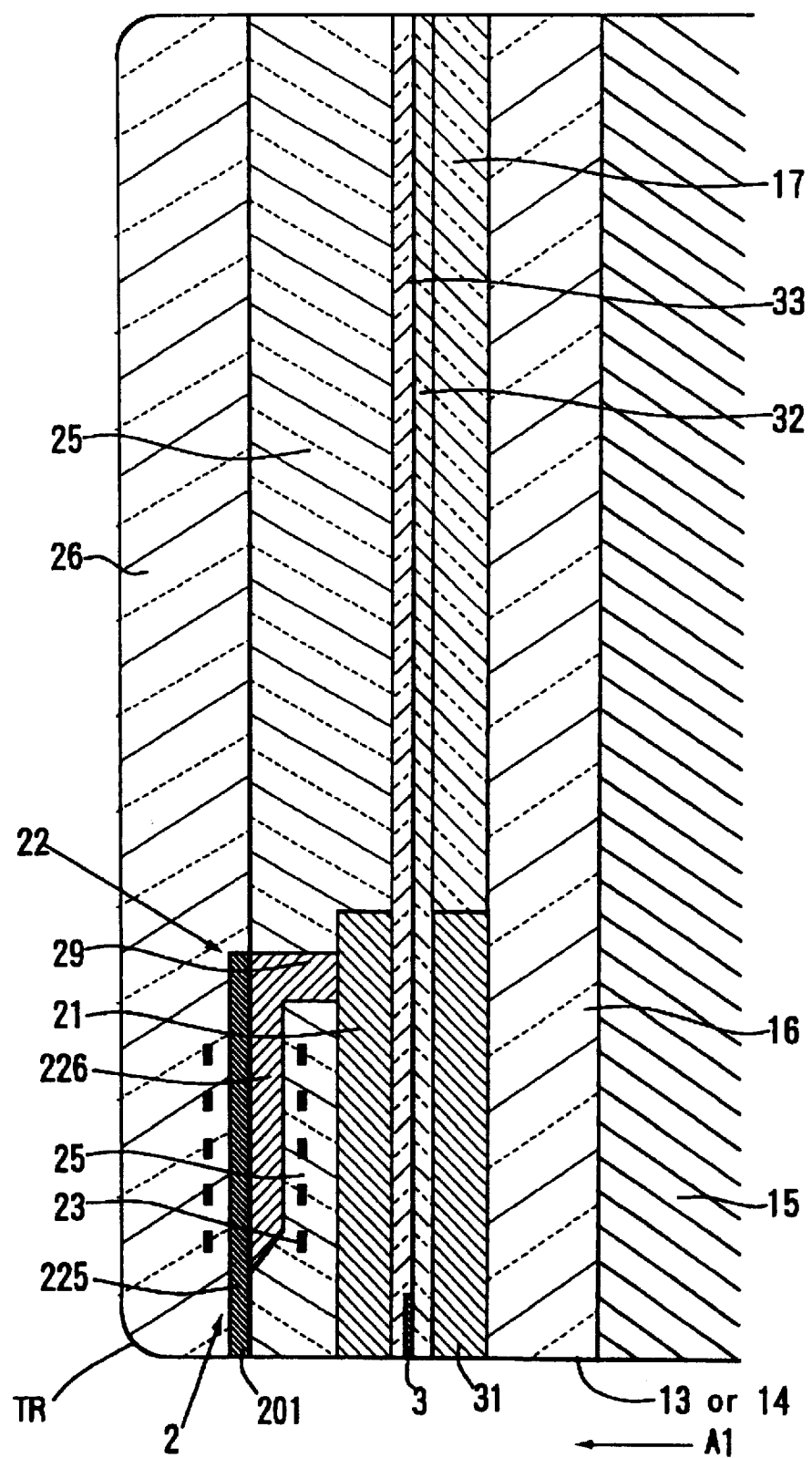
FIG. 11 is an enlarged cross sectional view of a perpendicular recording thin film magnetic head according to the present invention.
Figure 12:
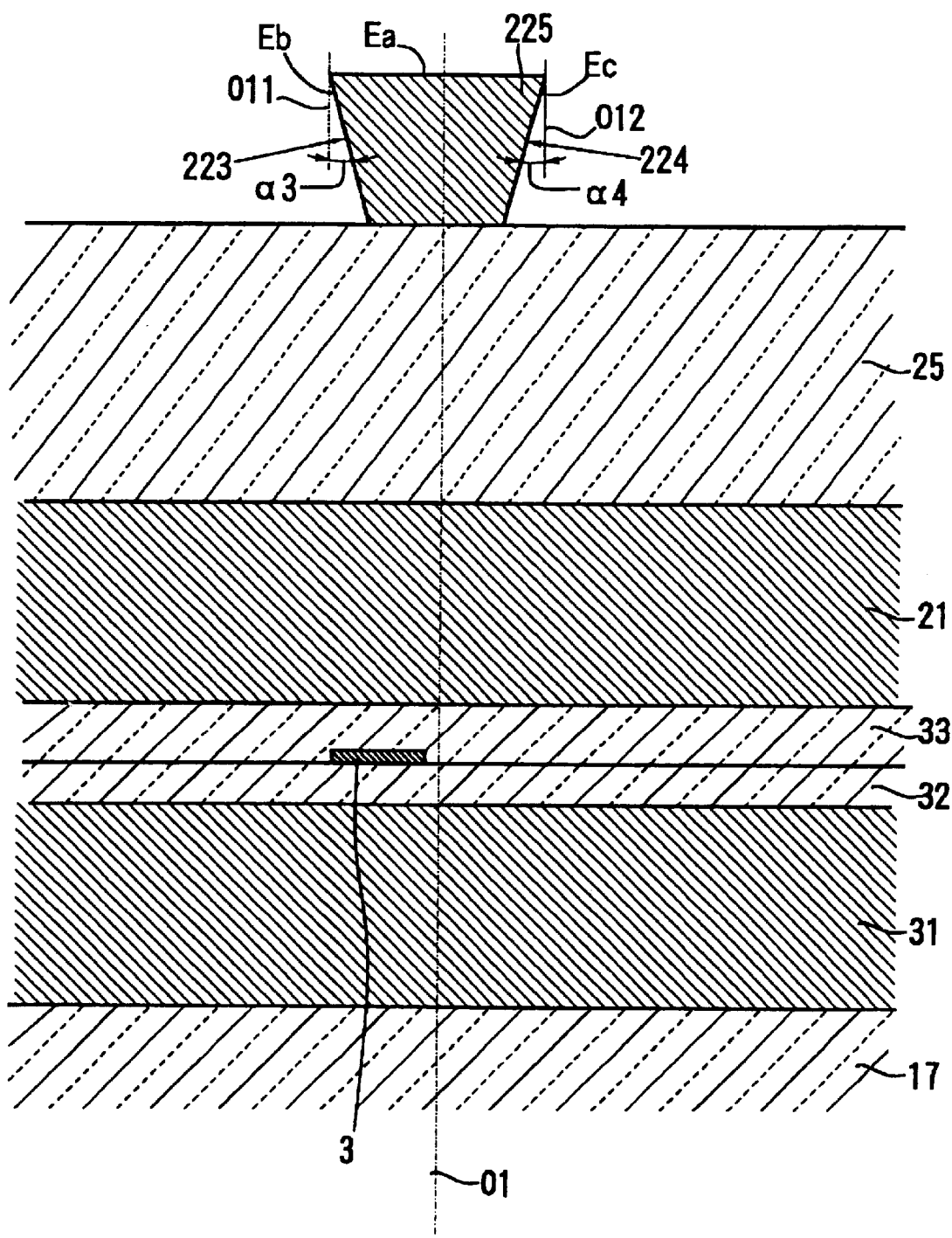
FIG. 12 is an end view of the pole structure of the thin film magnetic head shown in FIG. 11, as viewed from the ABS.

FIG. 11 is an enlarged cross sectional view of a perpendicular recording thin film magnetic head according to the present invention, and FIG. 12 is an enlarged end view of the pole structure of the thin film magnetic head shown in FIG. 11, as viewed from the ABS. In the perpendicular recording thin film magnetic head depicted in the figures, the second magnetic film 22 includes a main magnetic pole 225 to constitute a perpendicular writing pole portion and a supplementary magnetic pole 226 to magnetically join the main magnetic pole 225 and the first magnetic film 21. The first magnetic film 21 constitutes magnetic flux-returning path. The coil film 23 is whirled around the main magnetic pole 225 and the supplementary magnetic pole 226. Detail explanation will be omitted for the other component parts because they are similar to the ones of the longitudinal recording thin film magnetic head as mentioned above. Using the perpendicular recording thin film magnetic head, the magnetic recording is carried out in the perpendicular direction to the surface of the magnetic disk through the perpendicular magnetization of the magnetic disk by the magnetic field generated from the edge portion of the main magnetic pole 225.

In the perpendicular recording thin film magnetic head, the main magnetic pole 225 has the above inclined side surfaces 223 and 224. In this case, the inclined side surfaces 223 and 224 are inclined at inclination angles α3 and α4 so that the track width can be increased toward the trailing edge TR, which is the other way around in the above longitudinal recording thin film magnetic film. The inclination angles α3 and α4 correspond to the angles of subtracting 90 degrees from the bottom interior angle of the rectangular end face of the main magnetic pole.

In FIG. 12, the edge Ea of the main magnetic pole in the trailing edge TR will be called as a "back edge", and the edges Eb and Ec of the main magnetic pole in the track direction will be called as "side edge"s.

In this case, recorded data by the magnetic fields generated at the side edges Eb and Ec of the main magnetic pole 225 are canceled by the magnetic field generated at the back edge Ea in the skew region. Therefore, the magnetic recording is carried out for the magnetic disk only by the magnetic field at the back edge Ea. Only if the magnetic recording is carried out by the magnetic field generated at the back edge Ea depart from the neighboring track, the magnetic field can not overlap the neighboring track, and thus, the data-rewriting and data-erasing in the neighboring track can be inhibited even though the magnetic disk has a large TPI. In this point, detail explanation will be given with reference to FIGS. 7, 13 and 14.

Figure 13:
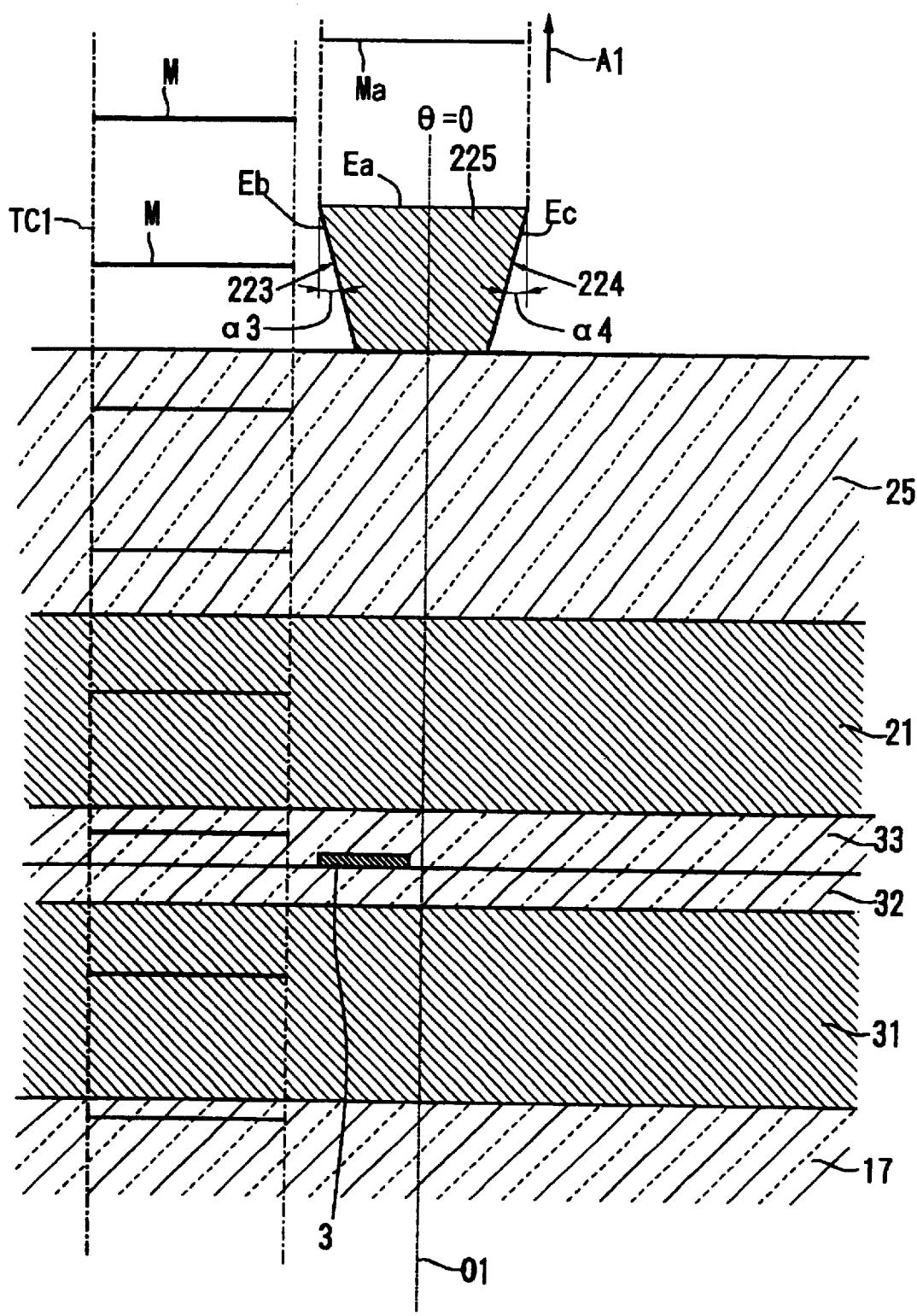
FIG. 13 is an end view showing the state in which the main magnetic pole of the perpendicular recording thin film magnetic head shown in FIGS. 11 and 12 is positioned at skew angle θ=0 in a magnetic disk drive device.

FIG. 13 is an end view showing the state in which the main magnetic pole of the perpendicular recording thin film magnetic head shown in FIGS. 11 and 12 is positioned at skew angle θ=0 in the magnetic disk drive device shown in FIG. 7. In this case, the center line O1 of the thin film magnetic head 4 corresponds to the A1 running direction of the magnetic disk 7 (see, FIG. 7). In the inclined side surface 223 of the main magnetic pole 225, the widest back side edge Ea is closest to the neighboring track TC1, and the side edges Eb and Ec are inclined at the inclination angles α3 and α4 toward the bottom surface of the main magnetic pole from the back edge Ea, and thus, receded from the neighboring track TC1.

Therefore, only if the back edge Ea is receded from the neighboring track TC1 by a given distance, the magnetic field generated at the back edge Ea can not overlap the neighboring track TC1. As a result, the above data-rewriting, side erasing and recording blur in the neighboring track TC1 can be removed.

Moreover, since recorded data by the magnetic fields generated at the side edges Eb and Ec are canceled by the magnetic field generated at the back edge Ea, the magnetic recording Ma is performed, corresponding to the configuration of the back edge Ea.

Figure 14:
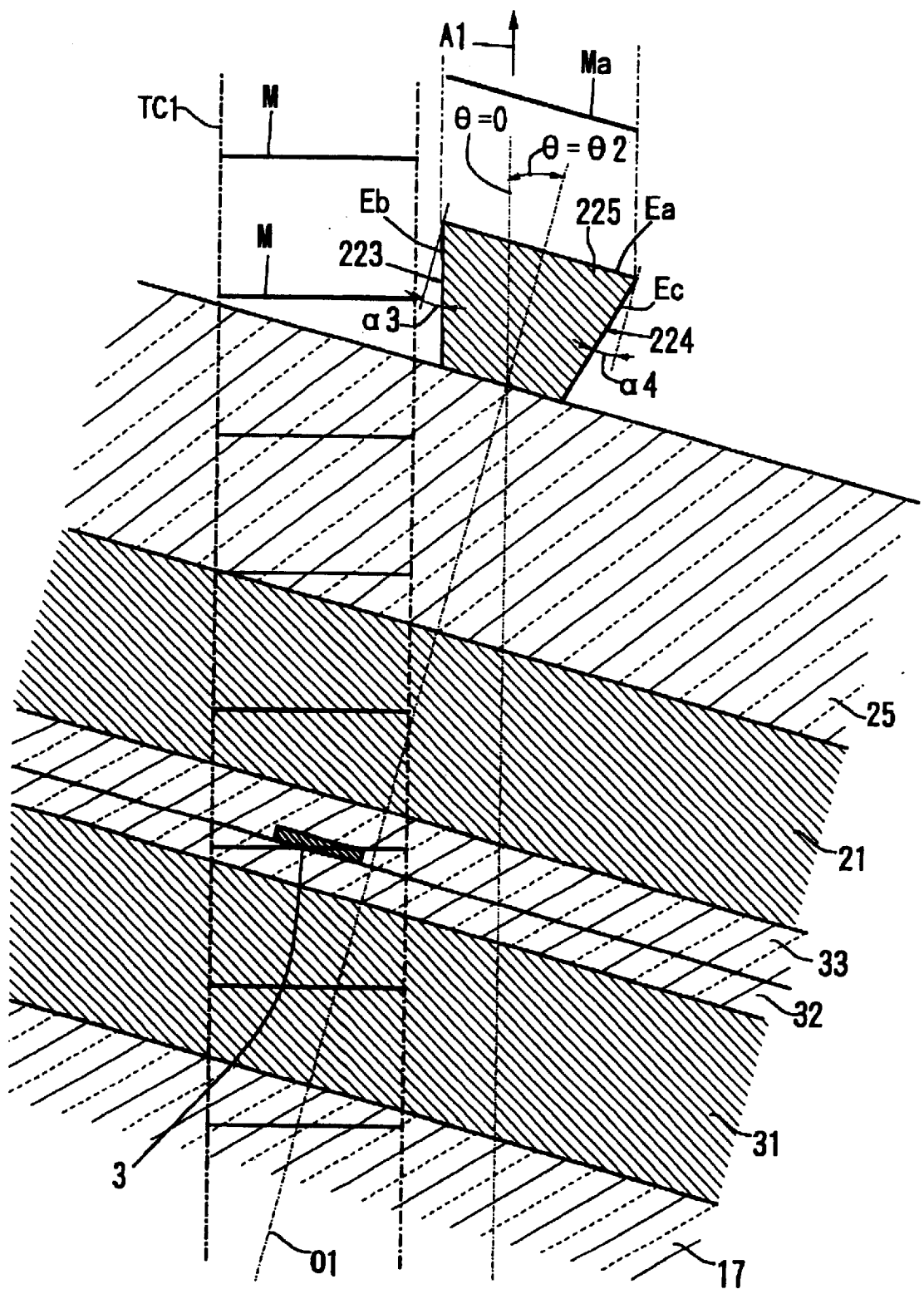
FIG. 14 is an end view showing the state in which the main magnetic pole of the perpendicular recording tin film magnetic head shown in FIGS. 11 and 12 is skewed toward the outside of the magnetic disk.

FIG. 14 is an end view showing the state in which the main magnetic pole of the perpendicular recording tin film magnetic head shown in FIGS. 11 and 12 is skewed at a skew angle θ2 slightly smaller than the maximum skew angle αm2 toward the outside of the magnetic disk 7. In this case, the center line O1 of the thin film magnetic head 4 is inclined by the skew angle θ2 smaller than the inclination angle α3 from the A1 running direction of the magnetic disk 7.

In this case, the back side edge Ea is closest to the neighboring track TC1, and the side edges Eb and Ec are inclined at the inclination angles α3 and α4 toward the bottom surface of the main magnetic pole from the back edge Ea, and thus, receded from the neighboring track TC1.

Therefore, only if the back edge Ea is depart from the neighboring track TC1, the magnetic field can not overlap the track TC1, and thus, the data-rewriting, the side erasing and the recording blur in the track TC1 can be inhibited.

Moreover, since recorded data by the magnetic fields generated at the side edges Eb and Ec are canceled by the magnetic field generated at the back edge Ea, the magnetic recording Ma is performed in the magnetic disk 7, corresponding to the configuration of the back edge Ea.

Not shown, if the main magnetic pole of the perpendicular recording thin film magnetic head shown in FIGS. 11 and 12 is skewed toward the inside of the magnetic disk 7, the above magnetic recording Ma is performed by the same manner.

Figure 15:
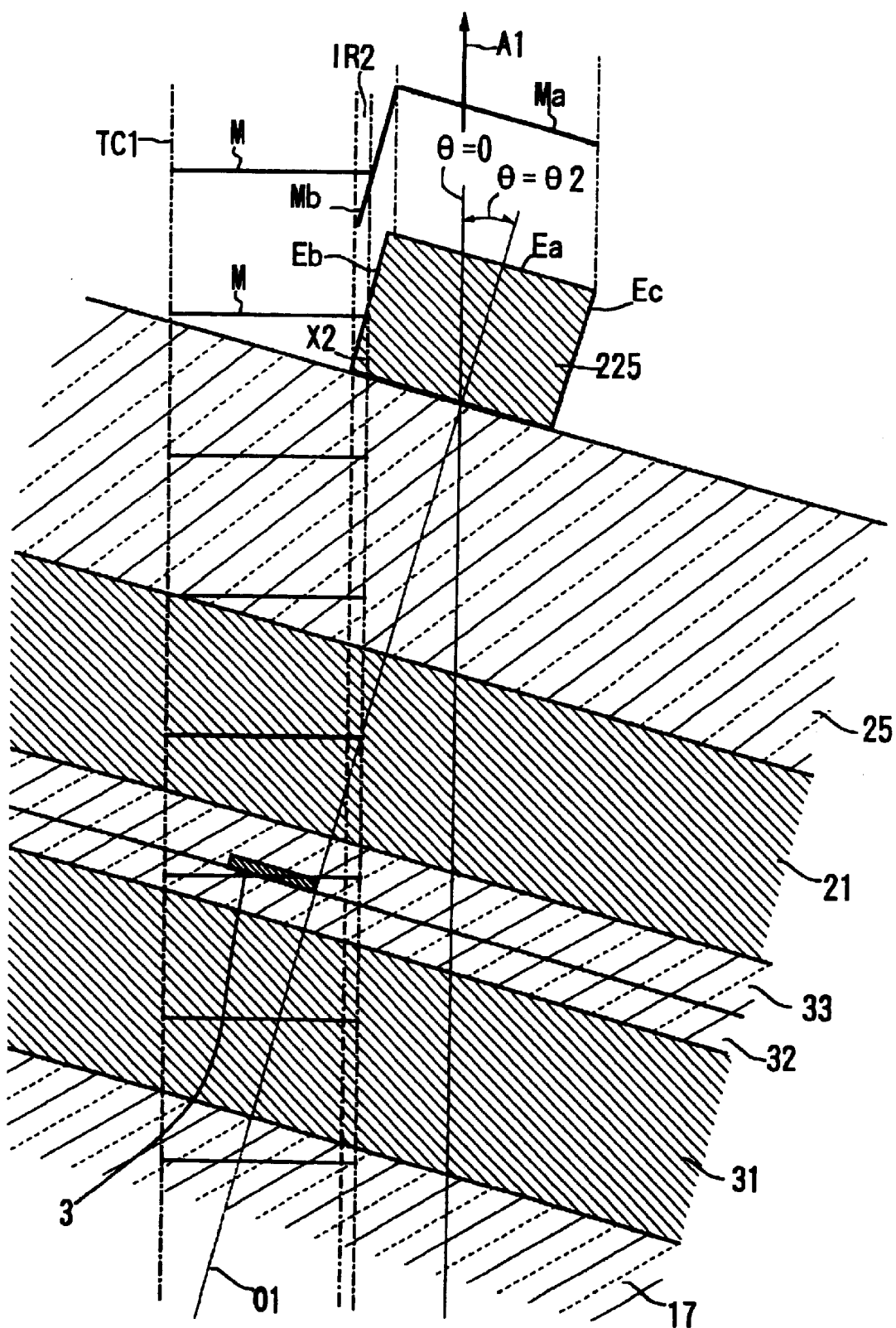
FIG. 15 is an end view showing the state in which a rectangular main magnetic pole of a perpendicular recording thin film magnetic head is skewed toward the outside of the magnetic disk.

FIG. 15 is an end view showing the state in which, in the case that the main magnetic pole 225 of the perpendicular recording thin film magnetic head has a rectangular cross section, the main magnetic pole is skewed toward the outside of the magnetic disk 7. In this case, the side edge Eb to constitute the inclined side surface 223 of the main magnetic pole 225 overlaps partially at the corner edge X2, and thus, the data-rewriting, the side erasing or the recording blur IR2 in the neighboring track TC1.

Moreover, the magnetic recording Mb is carried out by the magnetic field generated from the side edge Eb of the main magnetic pole 225. The magnetic recording Mb can not rewritten by the magnetic field generated from the back edge Ea of the main magnetic pole 225. Therefore, in the magnetic disk 7 are performed the magnetic recording Ma corresponding to the configuration of the back edge Ea and the magnetic recording Mb corresponding to the configuration of the side edge Eb, which is not desired.

Figure 16:
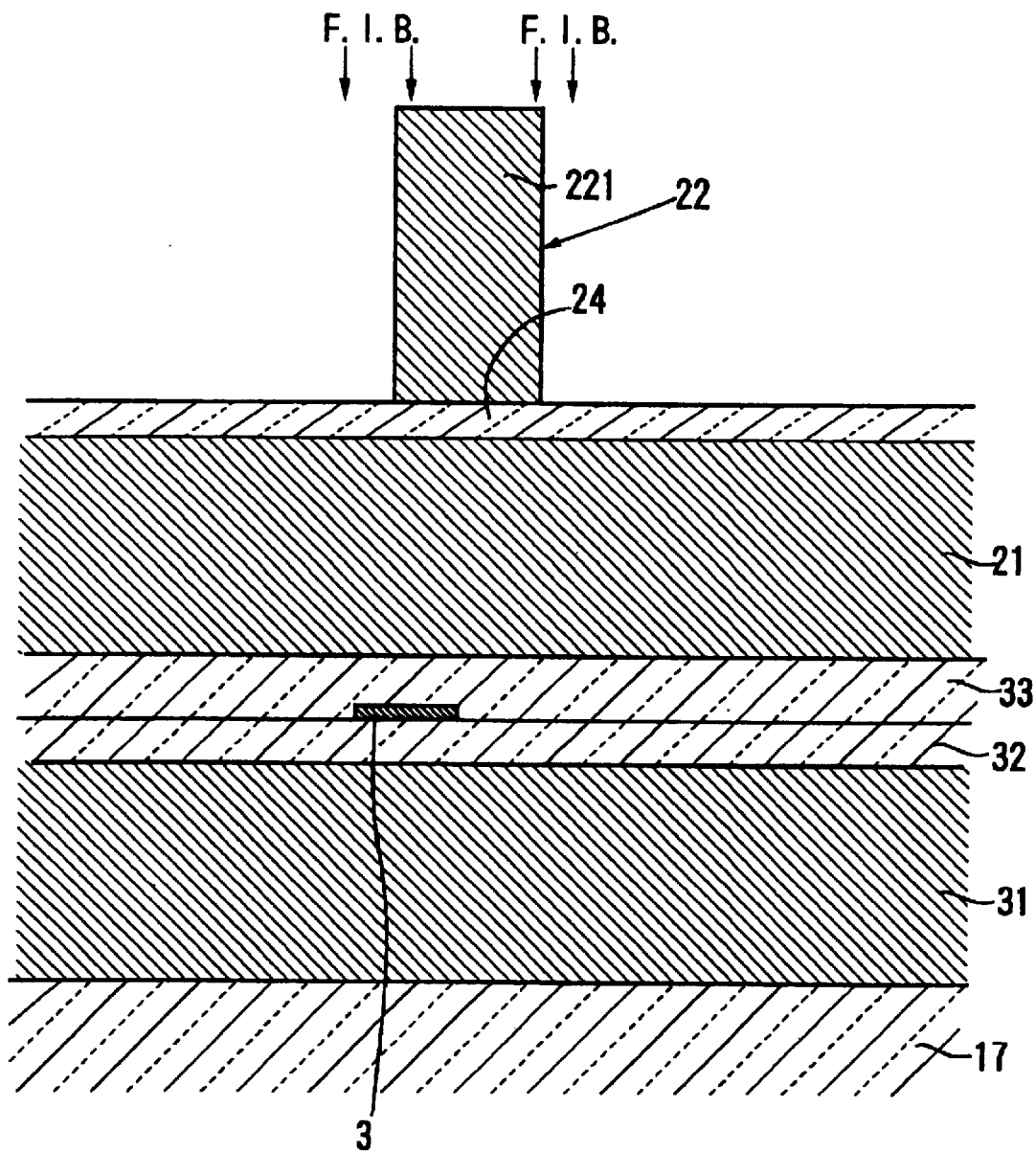
FIG. 16 is an end view showing a step in a thin film magnetic head-manufacturing method according to the present invention.

Next, a method for manufacturing a thin film magnetic head according to the present invention will be described with reference to FIGS. 16 and 17. First of all, as shown in FIG. 16, the bottom (first) shielding film 31, the insulating film 32, the MR element 3, the insulating film 33, the first magnetic film 21 (top shielding film) and the gap film 24 are formed on an insulating film 17 on the slider, and the second magnetic film 22 is formed on the gap film 24.

Figure 17:
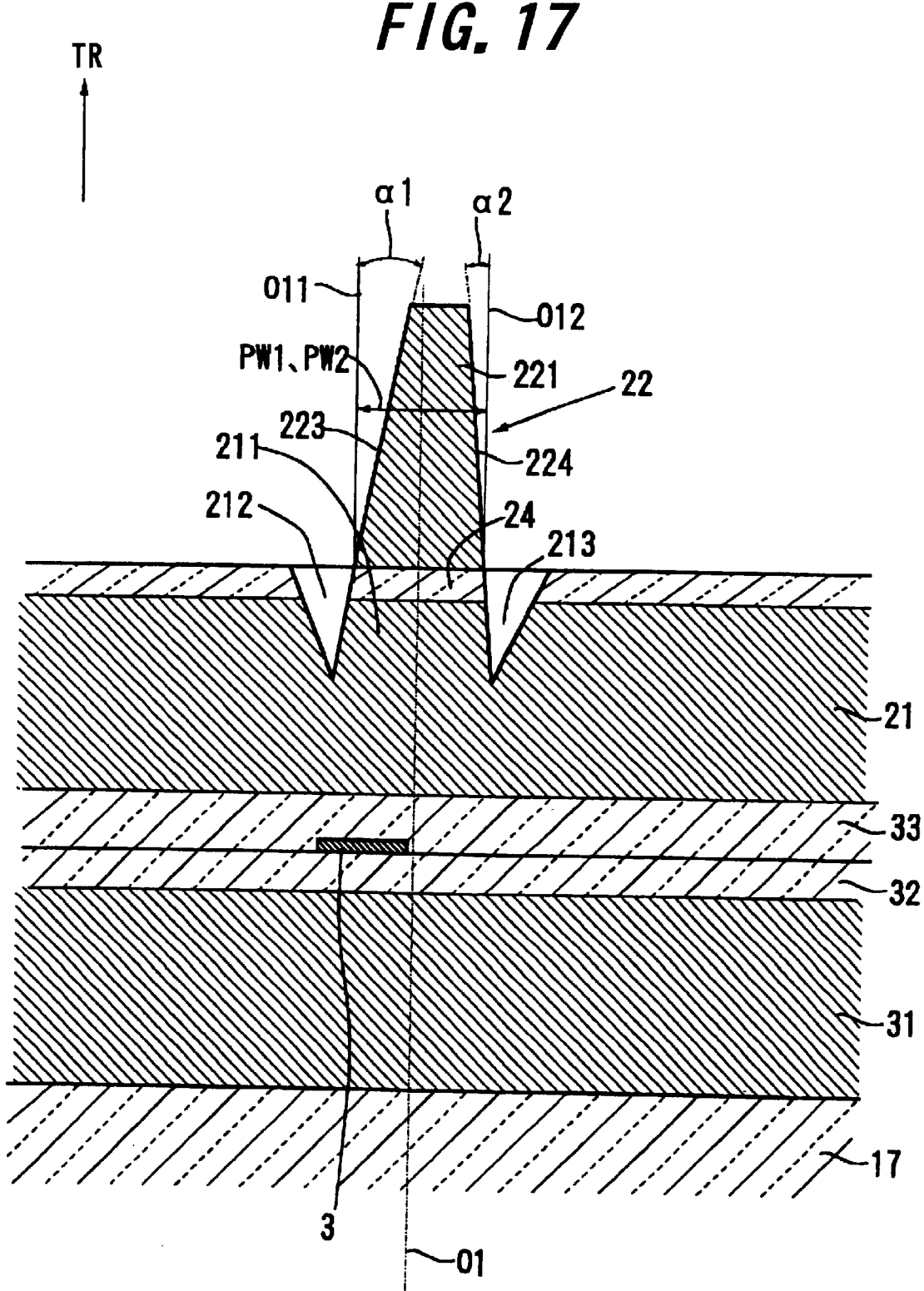
FIG. 17 is an end view showing the step after the step of FIG. 16.

Then, as shown in FIG. 17, the second magnetic film 22 is trimmed off so that the edge portion 221 to constitute the pole portion can have the side surfaces 223 and 224 inclined at the inclination angles α1 and α2 toward the trailing edge TR. The inclination angles α1 and α2 are larger than the maximum skew angle predetermined on a technical specification.

The trimming process is preferably carried out on a wafer to constitute the above slider later. Moreover, the trimming process is preferably carried out by focused ion beam (hereinafter, called as a "FIB"). When using the FIB, the wafer is inclined at a given angle to form the inclined side surfaces 223 and 224 having desired inclination angles α1 and α2.

Although the manufacturing method for the longitudinal recording thin film magnetic head shown in FIGS. 1–3 has been described with reference to FIGS. 16 and 17, the perpendicular recording thin film magnetic head shown in FIGS. 11 and 12 can be manufactured by the same manner as in FIGS. 16 and 17.

This invention has been described in detail with reference to the above preferred concrete embodiments, but it is obvious for the ordinary person skilled in the art that various modifications can be made in its configuration and detail without departing from the scope of this invention.

As mentioned above, this invention can provide the following effects:

(a) A thin film magnetic head, a magnetic head device and a magnetic disk drive device, which can avoid magnetic harmful effects such as data-rewriting or data-erasing in the neighboring track, can be provided.

(b) A thin film magnetic head, a magnetic head device and a magnetic disk drive device, which, in developing their TPI performances and realizing their high density recording, can avoid magnetic harmful effects such as data-rewriting or data-erasing in the neighboring track, can be provided.

(c) A method for preferably manufacturing the above thin film magnetic head can be provided.

What is claimed is:

1. A thin film magnetic head, which is driven at a given skew angle in a radial direction of a magnetic disk, comprising a slider and an inductive type electromagnetic conversion element, supported by the slider, including a first magnetic film, a second magnetic film and a coil film, one edge portion of the first magnetic film is positioned at an air bearing surface side of the thin film magnetic head, the first magnetic film being extended backward from the air bearing surface, one edge portion of the second magnetic film being opposed to the one edge portion of the first magnetic film by a given distance in the air bearing surface side and having, in a track width direction of the thin film magnetic head, at least one inclined side surface maintained constant in a direction perpendicular to the plane of the magnetic disk and having an inclination angle not less than the maximum skew angle, the second magnetic film being positioned at a trailing edge side of the film magnetic head relative to the first magnetic film and extended backward from the air bearing surface, joined with the first magnetic film, the coil film being whirled around the magnetic circuit composed of the first and the second magnetic films.

2. A thin film magnetic head as defined in claim 1, wherein the inductive type electromagnetic conversion element comprises a gap film, and the one edge portions of the first and the second magnetic films are opposed each other via the gap film, thereby to constitute a pole portion.

3. A thin film magnetic head as defined in claim 2, wherein the side surface of the one edge portion of the second magnetic film is inclined so that the track width can be decreased toward the trailing edge.

4. A thin film magnetic head as defined in claim 1, wherein the second magnetic film includes a main magnetic pole to constitute a perpendicular recording pole portion and a supplementary magnetic pole to magnetically join the main magnetic pole and the first magnetic film.

5. A thin film magnetic head as defined in claim 4, wherein the main magnetic pole has the above side surface inclined so that the track width can be increased toward the trailing edge.

6. A thin film magnetic head as defined in claim 1, further comprising at least one magnetoresistive effective element as a reading element.

7. A thin film magnetic head as defined in claim 6, wherein the magnetoresistive effective element has a spin-valve structure.

8. A thin film magnetic head as defined in claim 6, wherein the magnetoresistive effective element is composed of a ferromagnetic tunnel junction effective element.

9. A thin film magnetic head as defined in claim 6, wherein the magnetoresistive effective element is composed of a giant magnetoresistive effective element including a perovskite type magnetic body.

10. A magnetic head device comprising a thin film magnetic head as defined in claim 1, and a head supporting device to support the thin film magnetic head.

11. A magnetic recording drive device comprising a magnetic head device as defined in claim 10 and a magnetic disk to be magnetically recorded and reproduced by the magnetic head device.

12. A method for manufacturing a thin film magnetic head as defined in claim 1, comprising the step of trimming the second magnetic film after its formation so that the side surface of the one edge portion of the second magnetic film can be inclined toward the trailing edge at the inclination angle not less than the maximum skew angle.

13. A method for manufacturing a thin film magnetic head as defined in claim 12, wherein the trimming process is carried out on a wafer to constitute the slider later.

14. A method for manufacturing a thin film magnetic head as defined in claim 12, wherein the trimming process is carried out by using focused ion beam.

* * * * *